United States Patent
Goh (10) Patent No.: US 10,104,146 B2
(45) Date of Patent: Oct. 16, 2018

(54) DPCM DATA COMPRESSION USING COMPRESSED DATA TAGS

(71) Applicant: STMicroelectronics Asia Pacific Pte Ltd, Singapore (SG)

(72) Inventor: Beng Heng Goh, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 272 days.

(21) Appl. No.: 15/208,217

(22) Filed: Jul. 12, 2016

(65) Prior Publication Data

US 2018/0020033 A1   Jan. 18, 2018

(51) Int. Cl.
| | |
|---|---|
| *H03M 7/30* | (2006.01) |
| *H04L 29/06* | (2006.01) |
| *H04L 12/863* | (2013.01) |
| *H04N 19/463* | (2014.01) |
| *H04B 14/06* | (2006.01) |
| *H04N 19/66* | (2014.01) |

(52) U.S. Cl.
CPC ......... *H04L 65/607* (2013.01); *H04B 14/062* (2013.01); *H04L 47/50* (2013.01); *H04L 65/604* (2013.01); *H04N 19/463* (2014.11); *H04N 19/66* (2014.11)

(58) Field of Classification Search
CPC ..... H04L 65/607; H04L 65/604; H04N 19/66; H04N 19/463; H04B 14/062
USPC ............................................... 341/76, 87, 51
See application file for complete search history.

(56) References Cited

U.S. PATENT DOCUMENTS

| | | | |
|---|---|---|---|
| 9,300,569 B2* | 3/2016 | Hui .................. | H04L 45/14 |
| 9,445,095 B1* | 9/2016 | Wheelock ............ | H04N 21/60 |
| 9,924,000 B2* | 3/2018 | Bertz .................. | H04L 69/22 |

OTHER PUBLICATIONS

Bouman, Katherine, et al: "RAW Camera DPCM Compression Performance Analysis," SPIE-IS&T/vol. 7867, 78670N-1, http://proceedings.spiedigitallibrary.org/, 2011 (7 pages).
Walls, Frederick et al: "VESA Display Stream Compression," VESA, Mar. 3, 2014 (5 pages).

* cited by examiner

*Primary Examiner* — Brian Young
(74) *Attorney, Agent, or Firm* — Crowe & Dunlevy (57) ABSTRACT

Disclosed herein is a method including receiving a stream of packets into a buffer, each packet having a processed video data portion and a page count portion, the processed video data portion being a result of a modulo operation performed on a word of video data, and the page count portion being a data page number on which the word of video data is to be placed. Each packet is read from the buffer, and an output packet including the video data portion and a data tag portion is generated therefrom. The data tag portion is associated with, but does not directly represent, the data page number where the word of video data of the processed video data portion or of video data of a processed video data portion of a next packet, is to be placed. Each data tag portion contains fewer bits than each corresponding page count portion.

35 Claims, 7 Drawing Sheets

DPCM DATA COMPRESSION USING COMPRESSED DATA TAGS

BACKGROUND

Figure 1:
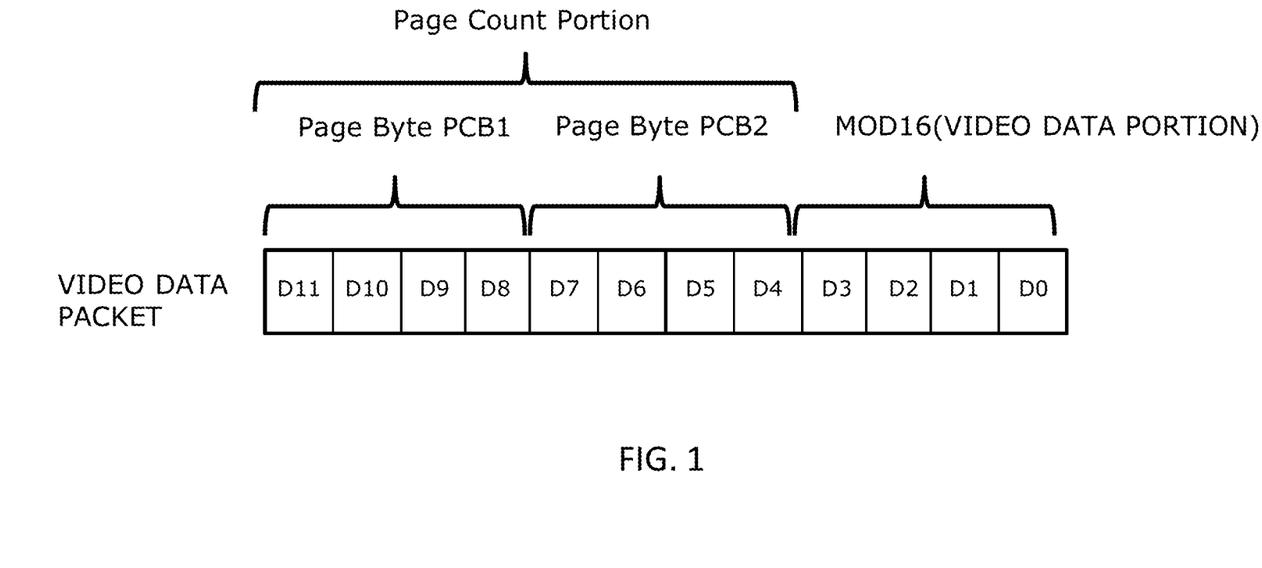
FIG. 1 shows contents of a packet of video data compressed using a known DPCM technique.

Portable electronic devices, such as smartphones and tablets, are often used to play video data. Differential pulse code modulation (DPCM) is commonly used for the transmission of this video data. With some DPCM techniques, a modulo divide is performed on the video data for a given pixel to be encoded, and the result of that modulo divide is placed into a video data portion of a video data packet, as shown in FIG. 1. The page on which that video data, or the video data of a next data packet, is to be placed is directly is directly represented in a page count portion of the video data packet which is separated into two page count bytes PCB1, PCB2, as also shown in FIG. 1.

While DPCM provides for useful compression for video data for transmission in such portable electronic devices, such portable electronic devices run on battery power, and the transmission, reception, and playback of such compressed video data can result in heavy power consumption. Therefore, development of techniques that enable the compression of video data, yet reduce power consumption, is needed.

SUMMARY

One general aspect disclosed herein is an electronic device including processing circuitry. The processing circuitry includes a buffer configured to receive a stream of packets, with each packet having a processed video data portion and a page count portion associated with the processed video data portion, where the processed video data portion is a result of a modulo operation performed on a word of video data, and where the page count portion is a data page number on which the word of video data is to be placed. The processing circuitry also includes a data packer configured to read each packet from the buffer, and to generate from each an output packet including the processed video data portion and a data tag portion. The data tag portion is associated with, but does not directly represent, the data page number on which the word of video data associated with the processed video data portion, or the word of video data associated with a processed video data portion of a next packet, is to be placed. Each data tag portion contains fewer bits than each corresponding page count portion. A transmission chain is coupled to the processing circuitry and configured to transmit each output packet.

Implementations may include one or more of the following features. The data packer may generate from each packet read from the buffer an output packet including of the processed video data portion and a tag portion, where the data tag portion does not contain bits unassociated with the data page number on which the word of video data associated with the processed video data portion of the next packet is to be placed. The buffer may be a FIFO buffer such that a first packet of the stream of packets written into the FIFO buffer is a first packet read out of the fifo buffer by the data packer. Each output packet may contain half a number of bits as each corresponding packet. The page count portion may include first and second byte portions, the modulo operation may include a modulo 16 operation, and the first and second byte portions may represent first and second page counter bit portions.

The page count portion may include six bits, and the modulo operation may include a modulo 64 operation. The data tag portion of a given output packet may contain control bits instructing that a word of video data associated with a processed video data portion of the given output packet or a word of video data associated with a processed video data portion of a next output packet is to be placed on a data page immediately subsequent to a current data page. The data tag portion of a given output packet may contain control bits instructing that a word of video data associated with a processed video data portion of the given output packet or a word of video data associated with a processed video data portion of a next output packet is to be placed on a data page immediately precedent to a current data page.

The data tag portion of a given output packet may contain control bits that, in conjunction with control bits of a data portion of a next output packet, instruct that a word of video data associated with a processed video data portion of the given output packet or a word of video data associated with a processed video data portion of an output packet after the next output packet is to be placed on a data page between 2 and N data pages subsequent to a current data page. The control bits of the next output packet may instruct that the word of video data associated with the processed video data portion of the given output packet or the word of video data associated with the processed video data portion of the output packet after the next output packet is to be placed on a data page subsequent to the current data page by a number directly represented in the processed video data portion of the next output packet. N may be less than 16.

The data tag portion of a given output packet may contain control bits that, in conjunction with control bits of a data portion of a next output packet, instruct that a word of video data associated with a processed video data portion of the given output packet or a word of video data associated with a processed video data portion of an output packet after the next output packet is to be placed on a data page between 2 and N data pages preceding to a current data page. The control bits of the next output packet may instruct that the word of video data associated with the processed video data portion of the given output packet or the word of video data associated with the processed video data portion of the output packet after the next output packet is to be placed on a data page precedent to the current data page by a number directly represented in the processed video data portion of the next output packet. N may be less than 16.

The data tag portion of a given output packet may contain control bits that, in conjunction with control bits of a data portion of a next output packet and of a data portion of an output packet subsequent to the next output packet, instruct that a word of video data associated with a processed video data portion of the given output packet or a word of video data associated with a processed video data portion of an output packet after the output packet subsequent to the next output packet is to be placed on a data page directly represented in the processed video data portion of the next output packet and the output packet subsequent to the next output packet. The data tag portion of a given output packet may contain control bits that, in conjunction with control bits of a data portion of a next output packet and of a data portion of an output packet subsequent to the next output packet, instruct that the processed video data portion of the next output packet and the output packet subsequent to the next output packet contain a control command for a receiver.

The transmission chain may include at least one register storing at least one of setup bits and cyclic redundancy check bits. The transmission chain may also include a ring buffer coupled to receive the setup bits and the cyclic redundancy check bits, and each output packet from the data packer. The transmission chain may also include an output buffer coupled to receive each output packet from the ring buffer. The transmission chain may also include a transmitter coupled to receive each data packet from the output buffer. The transmission chain may further include a state machine configured for reconfiguring each output packet into a format suitable for a high level transmit protocol.

One general aspect includes an electronic device including a receiver chain configured to receive a stream of input packets, each input packet including a processed video data portion and a data tag portion, with the processed video data portion being a result of a modulo operation performed on a word of video data, the data tag portion being associated with, but not directly representing, a data page number on which a word of video data associated with the processed video data portion, or a processed video data portion of a next input packet, is to be placed, where each data tag portion contains fewer bits than each corresponding page count portion. A data unpacker may be configured to read each input packet from the receiver chain, and to generate from each input packet an unpacked packet including the processed video data portion and a page count portion, where the page count portion directly represents the data page number.

One general aspect involves a method including receiving a stream of packets into a buffer, each packet having a processed video data portion and a page count portion, where the processed video data portion is a result of a modulo operation performed on a word of video data, where the page count portion is a data page number on which the word of video data is to be placed. The method also includes reading each packet from the buffer, and generating from each an output packet including the processed video data portion and a data tag portion. The data tag portion is associated with, but does not directly represent, the data page number on which the word of video data associated with the processed video data portion, or the word of video data associated with a processed video data portion of a next packet, is to be placed. Each data tag portion contains fewer bits than each corresponding page count portion. Each output packet is transmitted.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

Figure 2:
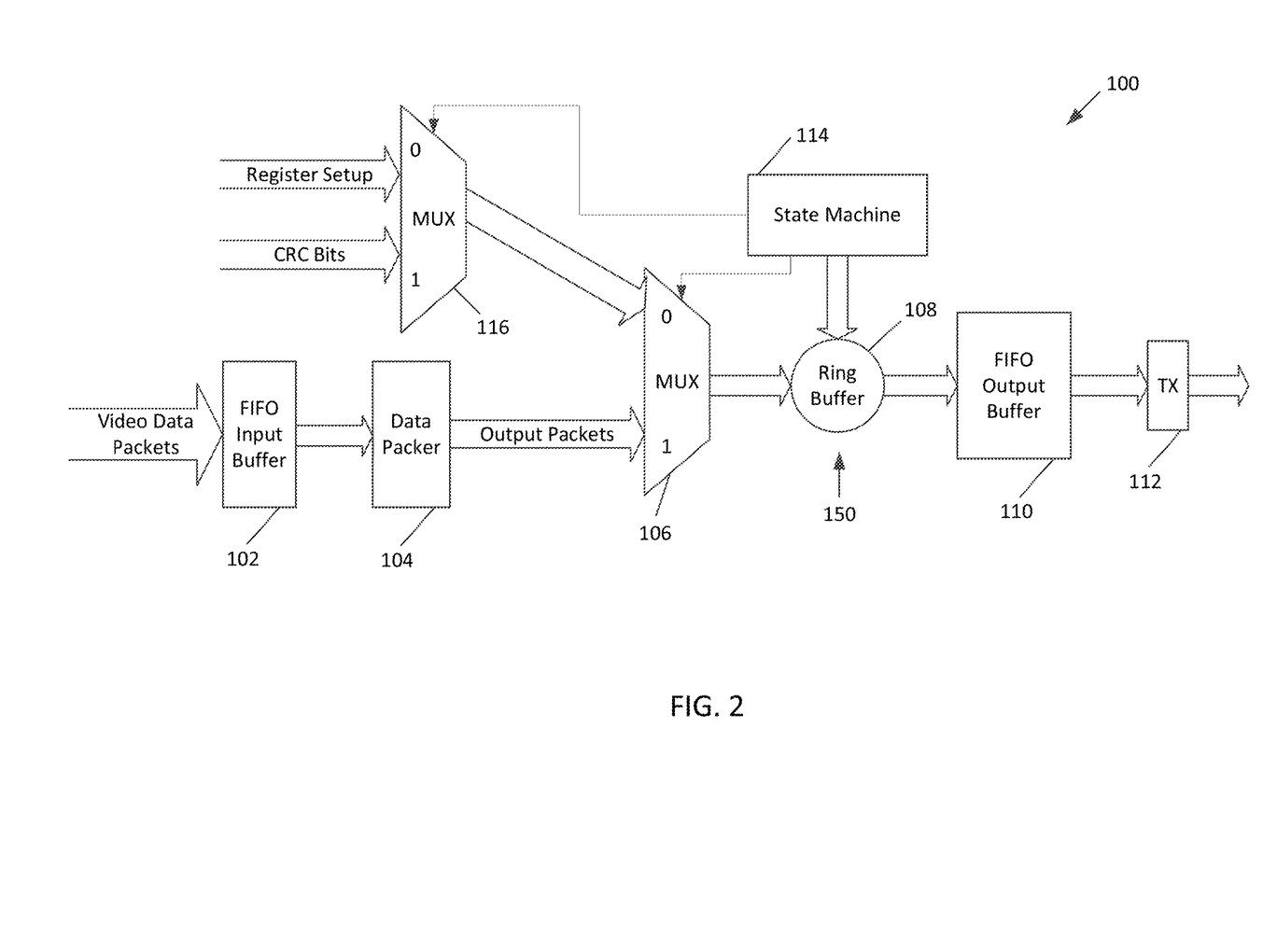
FIG. 2 shows an electronic device configured to perform the data compression techniques described herein and transmit compressed video data packets.

With initial reference to FIG. 2, an electronic device 100 for performing DPCM compression on video data packets is now described. The electronic device 100 may be a smartphone, tablet, laptop, hybrid tablet/laptop, or other suitable device.

Structurally, the electronic device 100 includes a FIFO (first in, first out) input buffer 102 that receives a stream of unpacked video data packets. A data packer 104 is coupled to the FIFO input buffer 102 to receive input therefrom. A first multiplexer 106 has a first input coupled to receive output packets from the data packer 104, and a second input coupled to receive output from a second multiplexer 116. The second multiplexer 116 receives as input register setup bits and cyclic redundancy bits. A ring buffer 108 receives input from the first multiplexer 106, as well as from a state machine 114. A FIFO output buffer 110 receives input from the ring buffer 108, and feeds its output to a transmitter 112.

In operation, the FIFO input buffer 102 receives a stream of video data packets. A sample received video data packet is shown in FIG. 1, and includes a video data portion and page count portion. The sample video data packet shown in FIG. 1 is comprised of 12 bits, 8 of which contain the page count portion, and 4 of which contain the video data portion. The video data portion contains the results of a modulo 16 divide on a pixel of video data, the page count portion is divided into two page bytes PCB1 and PCB2 which collectively represent the page on which the video data of the video data packet, or the video data of a pixel of a next video data packet, is to be placed.

Figure 3:
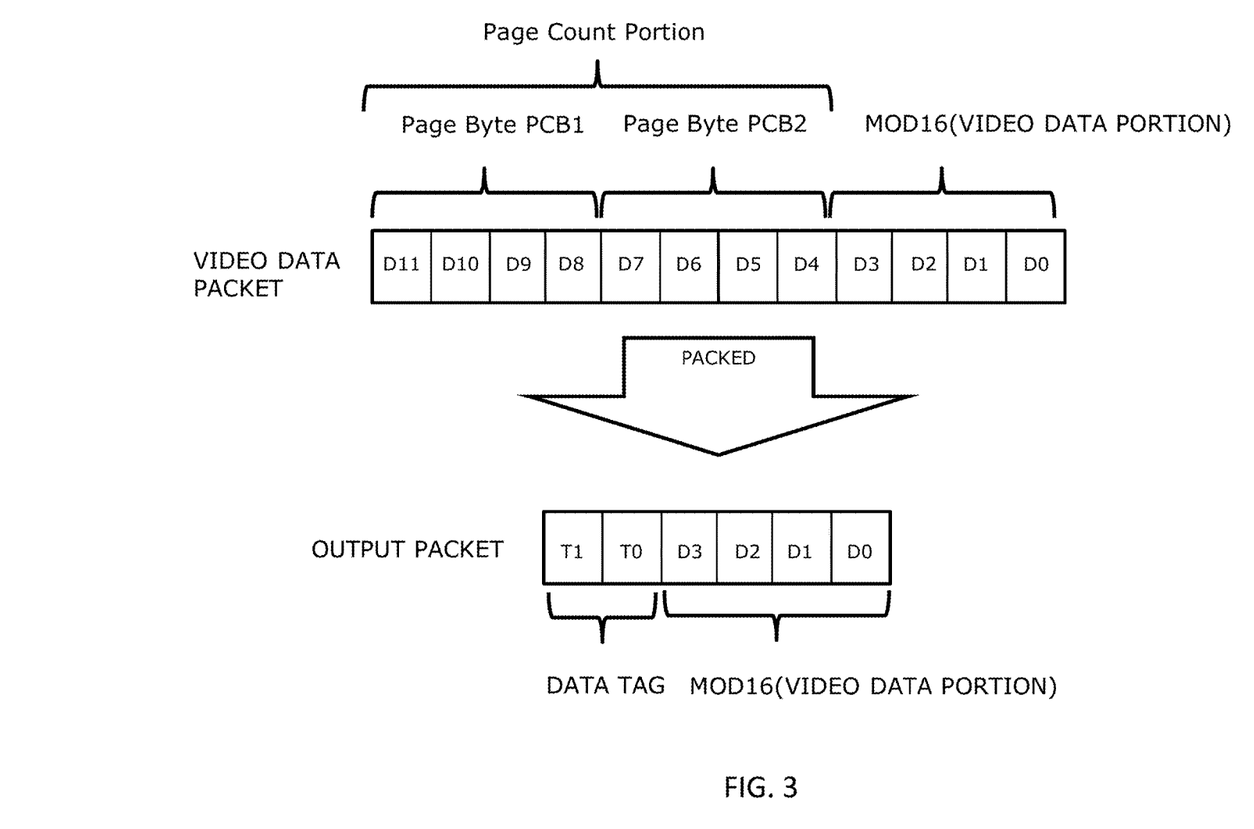
FIG. 3 shows contents of a packet of video data compressed using one of the data compression techniques described herein.

The data packer 104 receives each video data packet from the FIFO input buffer 102, and compresses or packs it into a packed output data packet, as shown in FIG. 3. The packed output data packet includes a 4 bit video data portion that is a copy of the video data portion of the video data packet as input and thus remained unchanged, and a 2 bit data tag portion. Therefore, as compared to the video data packet as input, the packed output data packet contains half the number of bits. Thus, using this technique (which will be described in detail below), the same video data can be transmitted using half the number of bits, which means that to achieve the same throughput, the frequency of the clock used for transmission of the output data packets can be halved compared to the conventional technique. This has a corresponding reduction in the power consumed by the transmitter 112, therefore increasing the battery life of (and improving the performance of) the electronic device 100 itself.

Figure 6:
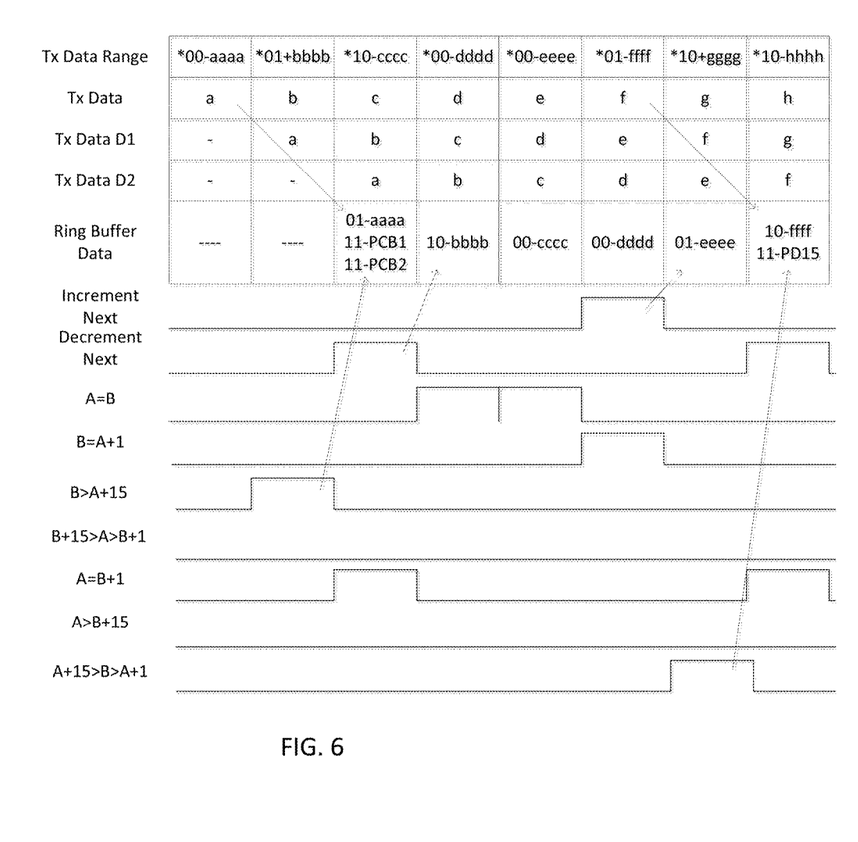
FIG. 6 is a timing diagram showing compression of a video packet in accordance with one of the data compression techniques described herein.

As will be explained in detail below, as shown in FIG. 6, the current and next data packets are available from delayed flip-flops (labels tx_data_d1 & tx_data_d2). The following pulses could be decoded—increment_next, decrement_next, A=B, B=A+1, B>A+1, B+15>A>B+1, A=B+1, A>B+15, and A+15>B>A+1, where A is the current page count value and B is the next page count value. These decoded pulses are used to pack or unpack according using data tag definitions which will be explained in detail below.

It is noted that the functions performed by the data packer 104 are performed on the fly in real time, and are performed quicker than any human could perform such functions by hand using pen and paper (i.e. in under 0.01 seconds). These functions of the data packer 104 can be performed by a special purpose microprocessor that is specifically programmed so as to perform these functions. The programming of this microprocessor results in the change of biasing of transistors of the microprocessor from when it was in an unprogrammed state. This change in transistor biasing results in the formation or deformation of channels of charge carrier conduction within the transistors. Since charge carriers are subatomic particles and therefore physical objects, the formation of a channel or deformation of a channel within a transistor thus represents a concrete, measurable, observable physical difference in that transistor. Consequently, the special purpose microprocessor, when specifically performed to perform the functions of the data packer 104, is physically different at a subatomic level than an unprogrammed microprocessor of the same type.

As can be appreciated from a quick review of FIG. 3, the data packer 104 generates the data tag from the page count portion, reducing the size from 8 bits to 2 bits. Thus, each data tag portion contains fewer bits than the corresponding page count portion from which it was generated.

To do this, the data tag contains data associated with, but not directly representing, a location where video data of either the current data packet or a next data packet is to be placed. For clarity, "directly representing" is used herein to mean that the bits contained in a page count portion are a direct binary representation of the data page. As an example, if the data page is 255, the bits in a page count portion of an unpacked packet would be "1111 1111". As a corollary, "not directly representing" is used herein to mean that the bits contained in a data tag portion are not a direct binary representation of the data page. As an example, if the data page is to be 254, the bits in the data tag portion might be "01", "00", "11", or "10", none of which is a direct binary representation of 254.

The data tag associated with the video data portion of the next data packet serves to instruct a receiver on how to calculate where the word of video data from the video data portion of the current data packer or the next data packet should be placed. A receiver may keep a "current page count" value in memory, and modify that current page count value according to instructions in the data tag. For example, a first data tag value, such as "01", may mean that the current page count is to be incremented by one for placing the word of video data from the video data portion of the current data packet or the next data packet. A second data tag value, such as "10", may mean that the current page count is to be decremented by one for placing the word of video data from the video data portion of the current data packet or the next data packet. A third data tag value, such as "00", may mean that the current page count is to be used for placing the word of video data from the video data portion of the current data packer or the next data packet.

In some scenarios, a fourth data tag value, such as "11", when preceded by the first, second, or third data tag values in a preceding output packet, can mean that the receiver is to look to the video data portion of the current data packet for data indirectly corresponding to the page on which the word of video data from the video data portion of the preceding or next data packet is to be placed, as modified by the preceding data tag. Thus, in such a scenario, the video data portion is not actually storing video data, but is instead storing a direct representation of a page number to be added or subtracted from a current page number.

For example, data tag values "01", "11" may mean that the word of video data from the video data portion of the current output packer or the next output packet (after the packet having the data tag of "11") is to be placed onto the page represented in the video data portion of the current output packet (with the data tag value of "11") after incrementation by the number of the current page. Thus, data tag values "10", "11" may mean that the word of video data from the video data portion of the current output packer or next output packet (after the packet having the data tag value of "11") is to be placed onto a page having a number that is the number of the current page less the number represented in the video data portion of the current output packet (with the data tag value of "11").

It should be appreciated that in some cases, the page onto which the word of video data from the video data portion of the current output packer or next output packet (after the packets having the data tag values of "11", and "11") is to be placed may be farther away from the current page than is representable in the number of bits allocated to a single video data portion of an output packet. Therefore, in those instances, the number at which the page onto which the word of video data from the video data portion of the current output packer or the next output packet (after the packets having the data tag values of "11", and "11") is to be placed may be contained in the video data portions of the current packet (with the data tag value of "11") and the next packet after that (also having the data tag value of "11").

Thus, as an example, data values of "01", "11", "11" may mean that the word of video data from the video data portion of the current output packer or next output packet is to be placed onto the page represented in the video data portion of the current output packet and next output packet (also having the data tag value of "11").

The data tag values "10", "11", "11" may mean that the video data portion of the current output packet (with the data tag value of "11") and the next packet after that (also having the data tag value of "11") contain control commands or codes.

Thus, it can be observed that where data tags of "11" and "11" follow the data tag "01", the word of video data from the video data portion of the current output packet or next output packet is to be placed onto a page more than N pages away from a current page, where N is the maximum number representable by the number of bits available to a single video data portion. Thus, in the packet shown in FIG. 3 where the video data portion is 4 bits on length, N is 15.

As a corollary, it can be observed that where a data tag of "11" follows the data tag "01", the word of video data from the video data portion of the current output packer or next output packet is to be placed onto a page less than N pages away from a current page, where N is the maximum number representable by the number of bits available to a single video data portion.

Returning now to the description of the operation of the electronic device 100, after packing and reduction from 12 bits to 6 bits, the output packets are fed to the first terminal of multiplexer 106. The other terminal of multiplexer 106 receives output of either register setup bits or cyclic redundancy check (CRC) bits from multiplexer 116. The state machine 114 controls the multiplexer 106 so as to place the appropriate bits (i.e. register setup, CRC, or those of an output packet) in the ring buffer 108 at the appropriate time so as to form an output data stream suitable for transmission using a high level transfer protocol. Output from the ring buffer 108 is fed to the FIFO output buffer 110, which then passes the output data stream to the transmitter 112 for transmission to a receiver.

Figure 5:
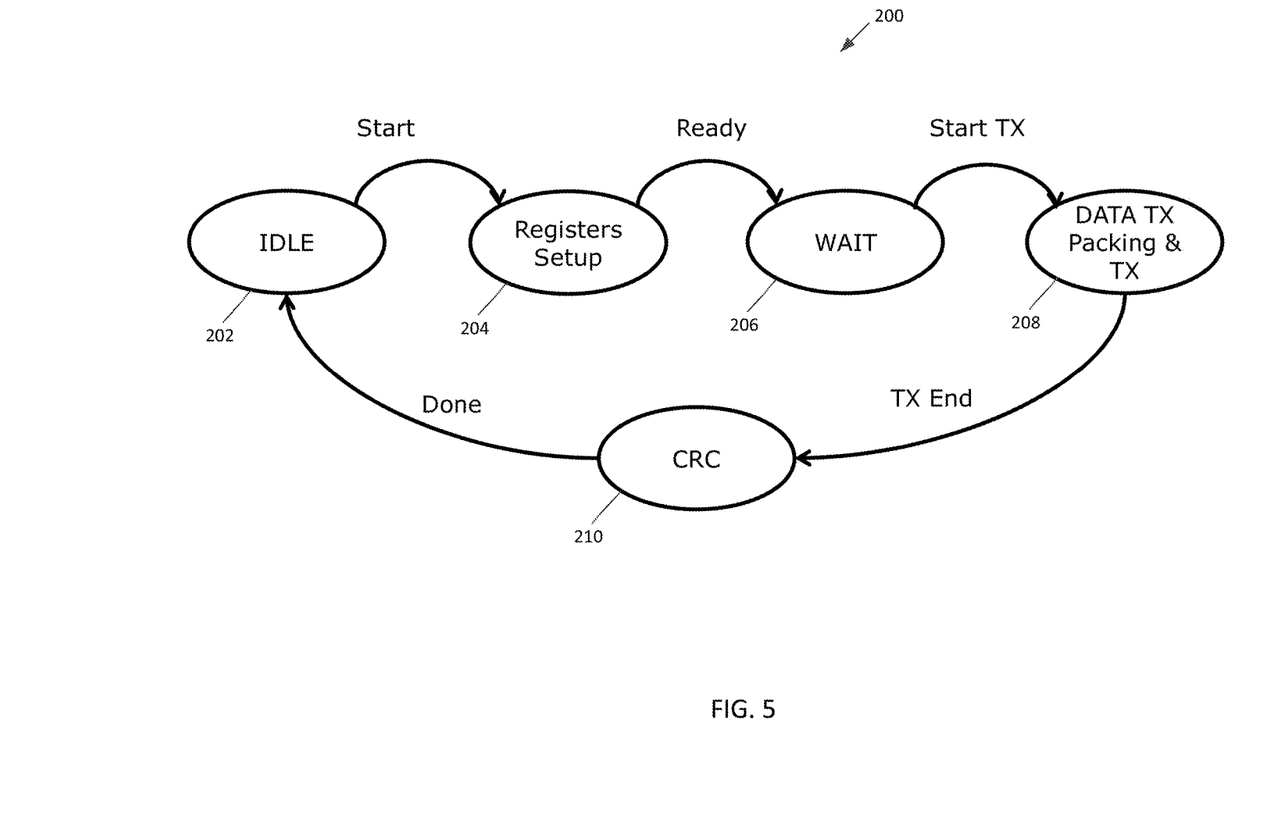
FIG. 5 shows potential states of the state machine of FIG. 2.

A sample state diagram 200 of the state machine 114 is shown in FIG. 5. Here, the state machine 114 begins in an idle state (state 202), and then controls the multiplexers 106 and 116 so as to receive the register setup bits (state 204). Hereafter, the state machine 114 enters a wait state (state 206). The state machine 114 then exits the wait state, and controls the multiplexers 106 and 116 so as to feed the output packets from the data packer 104 to the ring buffer 108 as the output data stream so that transmission can start (state 208). After transmission of an output packet, the state machine controls the multiplexers 106 and 116 so as to feed the CRC bits to the ring buffer 108 for transmission (state 210). At this point, the transmission of an output packet is complete, and the state machine 114 returns to the idle state (state 202).

A timing diagram of these operations performed by the data packer 104 in conjunction with the ring buffer 108 and state machine 114 is shown in FIG. 6. The legend for this figure is as follows:

*01-xxxx=>increment page counter for next data, *01+ xxxx=>next data is more than 2 pages from current data;
*10-xxxx=>decrement page counter for next data,*10+ xxxx=>next data is less than 2 pages from current data;
A: current data page, B: next data page, "PCB1, PCB2"=page counter byte to be loaded into receiver page counter when B>A+15 Pages or A>B+15;
Pages A & B in the same Page TAG="00";
B=A+1Page TAG="01";
A=B+1Pages TAG="10";
A+15>B>A+1, TAG sequence="01", "11";
B+15>A>B+1, TAG sequence "10711";
B>A+15Pages, TAG sequence="01", "11", "11";
PD15 to be ADD/Subtract from PC Page Differences from 2 to 15

The "Tx Data Range" line shows a truncated form of the contents of each packet of video data (prior to packing by the data packer 104). The "Tx Data" line represents each output packet (after packing by the data packer 104), while "Tx Data D1" represents "Tx Data" delayed by one clock cycle, and "Tx Data D2" represents "Tx Data" delayed by two clock cycles. "Ring Buffer Data" represents the contents of the ring buffer 108, and the remainder of the signals represent internal control signals within the data packer 104 used in generating the output packets.

In the Tx Data Range column, the first entry is "*00-aaaa", which, as shown in the legend at the bottom of FIG. 6, means that A and B (the video data from the current packet, and the video data from the next packet, respectively) are to be placed on a same page. However, since there is not yet B in the first column (as A is the first video data transmitted), this "*00-aaaa" entry means that A will simply go onto the current page.

The first entry in the Tx Data column is "a", used generically to indicate one or more packets used to transmit the data "aaaa" as well as information on where the data of the next packet (which, here would be "bbbb") is to be placed.

The second entry in the Tx Data Range row is "*01+ bbbb", which, as shown in the legend, means that the next video data is to be placed more than two pages from the current video data. This is indicated by the rising edge of the "B>A+15" row in the second column, and results in the output packets for "a" (since "b" is the next packet from "a") indicating that the video data from the next packet (here, "bbbb") is to be placed more than two pages from the current video data (here, "aaaa"). This results in the output packets for "a" being "01-aaaa", "11-PCB1", and "11-PCB2".

The second entry in the Tx Data column is "b", used generically to indicate one or more packets used to transmit the data "bbbb" as well as information on where the data of the next packet (which, here would be "cccc") is to be placed.

When viewing the chart of FIG. 6, it should be kept in mind that the first two bits of each entry in the Tx Data Range row represent where the video data contained in that entry is to be placed, whereas the first two bits of each entry in the Ring Buffer Data row (in accordance with the detailed description given above) represents where the video data contained in a next packet is to be placed.

The Ring Buffer Data row is empty in the first two columns because the output packet "a" generated from "*00-aaaa" has not yet been shifted through the ring buffer 108. In the third column of the Ring Buffer Data row, it is shown that in order to transmit the data "aaaa" as well as information on where "bbbb" is to be placed, three output packets are used. Here, the contents of those three output packets are encoded (as per the detailed description given above) as "01-aaaa", "11-PCB1", and "11-PCB2". This results in "aaaa" being placed on the current page, and "bbbb" being placed on a page equal to PCB1, PCB2.

The third entry in the Tx Data Range column is "*10-cccc", which as per the legend, indicates that the video data of the next packet is to be placed on the page immediately precedent to the current page. This is indicated by the signal in the Decrement Next row going high, and results in the output packet for "b" being "10-bbbb". Resultingly, the video data "cccc" is placed on the page immediately precedent to the current page.

The fourth entry in the Tx Data Range column is "*00-dddd", which as per the legend, indicates that the video data of the next packet is to be placed on the current page. This is indicated by the signal in the A=B row going high, and results in the output packet for "c" being "00-cccc". Consequently, the video data "dddd" is placed on the current page.

The fifth entry in the Tx Data Range column is "*00-eeee", which as per the legend, indicates that the video data of the next packet is to be placed on the current page. This is indicated by the signal in the A=B row going high, and results in the output packet for "d" being "00-dddd". Consequently, the video data "eeee" is placed on the current page.

The sixth entry in the Tx Data Range column is "*01-ffff", which as per the legend, indicates that the video data of the next packet is to be placed on the page immediately subsequent to the current page. This is indicated by the signal in the Increment Next row going high, and results in the output packet for "e" being "01-eeee". Consequently, the video data "ffff" is placed on the page immediately subsequent to the current page.

The seventh entry in the Tx Data Range column is "*10+gggg", which as per the legend, indicates that the video data of the next packet is to be placed on a page less than two pages from the current page. This is indicated by the signal in the "A+15>B>A+1" column going high, and results in the output packets for "f" being "10-ffff", "11-PD15". Consequently, the video data "gggg" is placed on a page calculated as the current page—PD15.

Unpacking of the output packets proceeds in reverse as is shown in FIG. 6.

Figure 7:
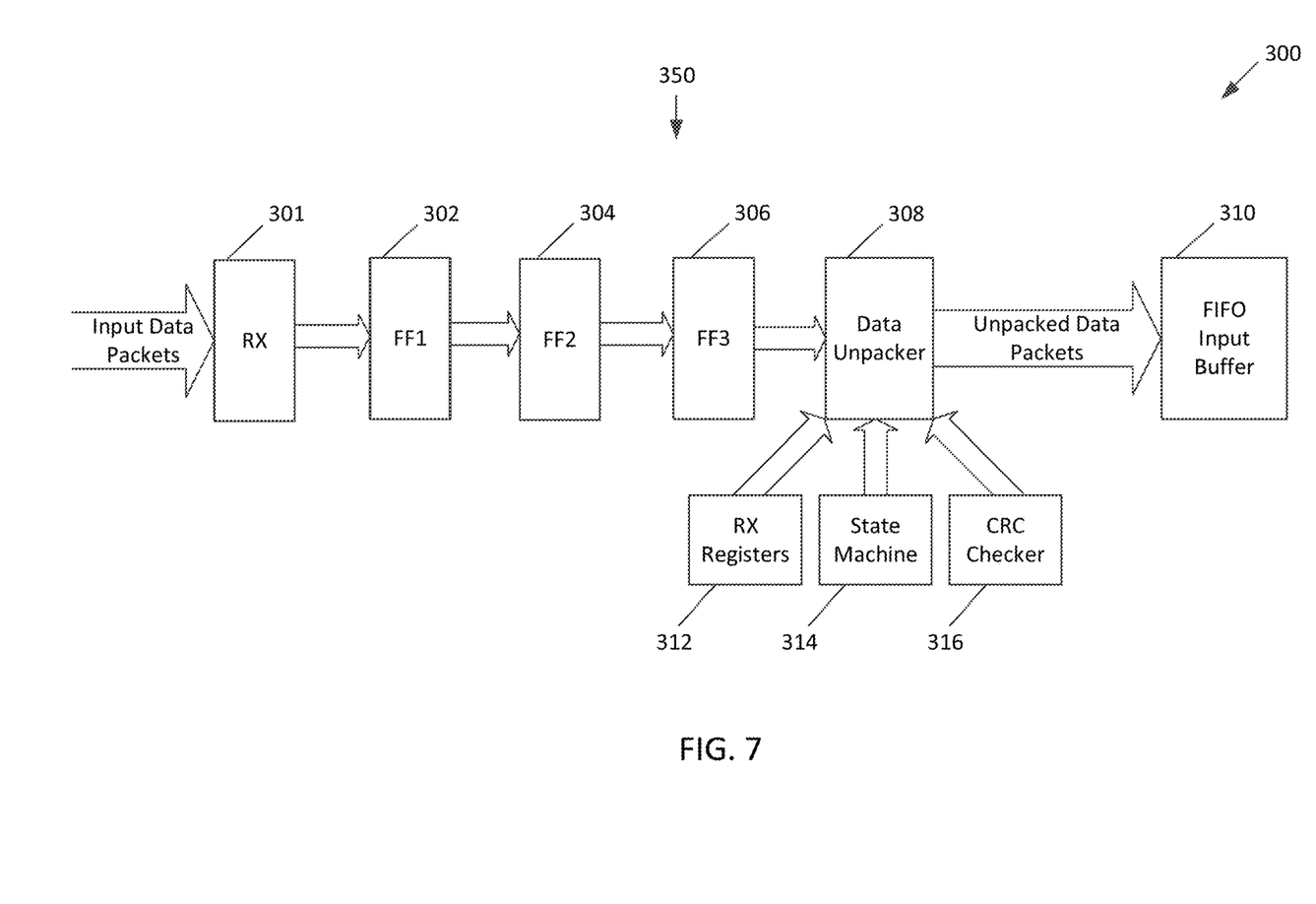
FIG. 7 shows an electronic device configured to receive compressed video data packets compressed in accordance with the data compression techniques described herein, and to uncompress those video data packets.

The above description has been with respect to an electronic device 100 for transmission in according to the techniques described herein. With reference to FIG. 7, an electronic device 300 for receiving input data packets packed according to the techniques herein is now described. The electronic device 300 includes a first flip flop 302 receiving the input data packets, a second flip flop 304 receiving output of the first flip flop 302, and a third flip flop 306 receiving output of the second flip flop 304. A data unpacker 308 receives output of the third flip flop 306. A FIFO (first in, first out) input buffer 310 receives unpacked data packets from the data unpacker 308. A state machine 314, receive registers 312, and a cyclic redundancy checker (CRC) 316 cooperate with the data unpacker 308.

In operation, the input data packets (corresponding to the transmitted output packets from the output data stream described above) are shifted through the flip flops 302, 304, and 306 so as to provide for data buffering. The data unpacker 308 receives the input data packets and unpacks them into the form they were in prior to packing by the data packer 104 of the electronic device 100. The unpacked packets are then fed to the FIFO input buffer 310, where they may be read out by other device (not shown) within the electronic device 300 for suitable purposes.

The receive registers 312 contain configuration bits read by the data unpacker 308 that serve to configure the data unpacker 308 to properly unpack the input data packets. The CRC checker 316 serves to enable the data unpacker 308 to perform CRC checking on the input data packets. The state machine 314 performs the reverse of the operations performed by the state machine 114, allowing reception of the data stream and reading of the input data packets therefrom by the data unpacker 308.

It should be appreciated that the electronic devices 100 and 300 may be contained within the same electronic device so that said electronic device is capable of packing outgoing packets, and unpacking incoming packets.

Figure 4:
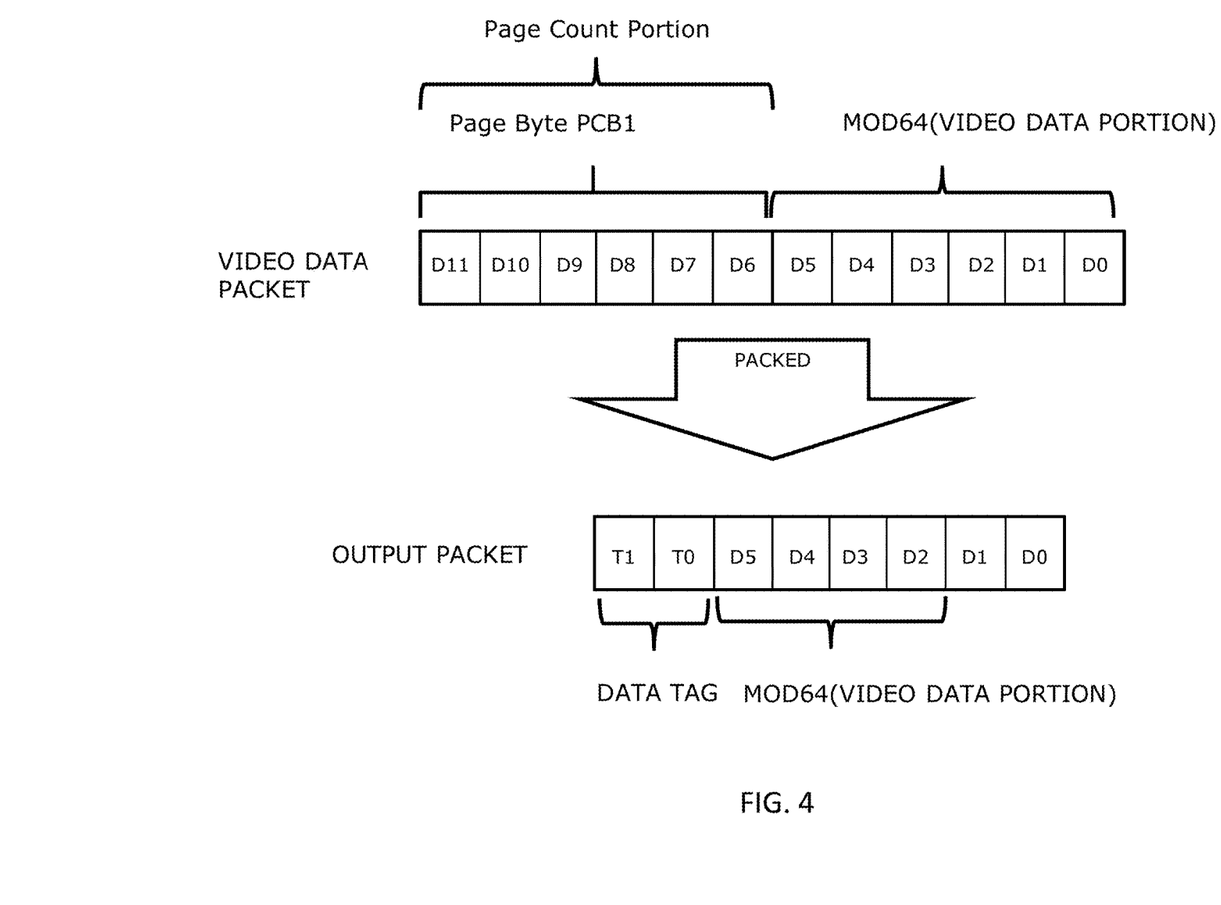
FIG. 4 shows contents of a packet of video data compressed using another of the data compression techniques described herein.

Although the above has been described using a scheme where the page count portion of the packets (prior to packing) is 8 bits long and the video data portion is 4 bits long, other configurations of packet are usable. For example, as shown in FIG. 4, the page count portion may be 6 bits long, and the video data portion may also be 6 bits long. In this case, the video data portion contains the result of a modulo 64 (as opposed to a modulo 16) divide on a pixel of video data. The resulting output packet after packing by the data packer 108 has 8 bits, 2 bits of which are the data tag, and 6 bits of which are the video data portion. Operation of the electronic devices 100 and 300, using the packet format shown in FIG. 4, proceeds as described above.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
processing circuitry comprising:
a buffer configured to receive a stream of packets, each packet having a processed video data portion and a page count portion associated with the processed video data portion, wherein the processed video data portion is a result of a modulo operation performed on a word of video data, wherein the page count portion is a data page number on which the word of video data is to be placed;
a data packer configured to read each packet from the buffer, and to generate from each an output packet comprising the processed video data portion and a data tag portion;
wherein the data tag portion is associated with, but does not directly represent, the data page number on which the word of video data associated with the processed video data portion, or the word of video data associated with a processed video data portion of a next packet, is to be placed;
wherein each data tag portion contains fewer bits than each corresponding page count portion; and
a transmission chain coupled to the processing circuitry and configured to transmit each output packet.

2. The electronic device of claim 1, wherein the data packer generates from each packet read from the buffer an output packet consisting of the processed video data portion and a tag portion; and wherein the data tag portion does not contain bits unassociated with the data page number on which the word of video data associated with the processed video data portion of the next packet is to be placed.

3. The electronic device of claim 1, wherein the buffer is a FIFO buffer such that a first packet of the stream of packets written into the FIFO buffer is a first packet read out of the FIFO buffer by the data packer.

4. The electronic device of claim 1, wherein each output packet contains half a number of bits as each corresponding packet.

5. The electronic device of claim 1, wherein the page count portion comprises first and second byte portions; wherein the modulo operation comprises a modulo 16 operation; and wherein the first and second byte portions represent first and second page counter bit portions.

6. The electronic device of claim 1, wherein the page count portion comprises six bits; and wherein the modulo operation comprises a modulo 64 operation.

7. The electronic device of claim 1, wherein the data tag portion of a given output packet contains control bits instructing that a word of video data associated with a processed video data portion of the given output packet or a word of video data associated with a processed video data portion of a next output packet is to be placed on a data page immediately subsequent to a current data page.

8. The electronic device of claim 1, wherein the data tag portion of a given output packet contains control bits instructing that a word of video data associated with a processed video data portion of the given output packet or a word of video data associated with a processed video data portion of a next output packet is to be placed on a data page immediately precedent to a current data page.

9. The electronic device of claim 1, wherein the data tag portion of a given output packet contains control bits that, in conjunction with control bits of a data portion of a next output packet, instruct that a word of video data associated with a processed video data portion of the given output packet or a word of video data associated with a processed video data portion of an output packet after the next output packet is to be placed on a data page between 2 and N data pages subsequent to a current data page.

10. The electronic device of claim 9, wherein the control bits of the next output packet instruct that the word of video data associated with the processed video data portion of the given output packet or the word of video data associated with the processed video data portion of the output packet after the next output packet is to be placed on a data page subsequent to the current data page by a number directly represented in the processed video data portion of the next output packet.

11. The electronic device of claim 10, wherein N is less than 16.

12. The electronic device of claim 1, wherein the data tag portion of a given output packet contains control bits that, in conjunction with control bits of a data portion of a next output packet, instruct that a word of video data associated with a processed video data portion of the given output packet or a word of video data associated with a processed video data portion of an output packet after the next output packet is to be placed on a data page between 2 and N data pages preceding to a current data page.

13. The electronic device of claim 12, wherein the control bits of the next output packet instruct that the word of video data associated with the processed video data portion of the given output packet or the word of video data associated with the processed video data portion of the output packet after the next output packet is to be placed on a data page precedent to the current data page by a number directly represented in the processed video data portion of the next output packet.

14. The electronic device of claim 12, wherein N is less than 16.

15. The electronic device of claim 1, wherein the data tag portion of a given output packet contains control bits that, in conjunction with control bits of a data portion of a next output packet and of a data portion of an output packet subsequent to the next output packet, instruct that a word of video data associated with a processed video data portion of the given output packet or a word of video data associated with a processed video data portion of an output packet after the output packet subsequent to the next output packet is to be placed on a data page directly represented in the processed video data portion of the next output packet and the output packet subsequent to the next output packet.

16. The electronic device of claim 1, wherein the data tag portion of a given output packet contains control bits that, in conjunction with control bits of a data portion of a next output packet and of a data portion of an output packet subsequent to the next output packet, instruct that the processed video data portion of the next output packet and the output packet subsequent to the next output packet contain a control command for a receiver.

17. The electronic device of claim 1, wherein the transmission chain comprises:
at least one register storing at least one of setup bits and cyclic redundancy check bits;
a ring buffer coupled to receive the setup bits and the cyclic redundancy check bits, and each output packet from the data packer;
an output buffer coupled to receive each output packet from the ring buffer; and
a transmitter coupled to receive each data packet from the output buffer.

18. The electronic device of claim 17, wherein the transmission chain further comprises a state machine configured for reconfiguring each output packet into a format suitable for a high level transmit protocol.

19. An electronic device, comprising:
a receiver chain configured to receive a stream of input packets, each input packet comprising a processed video data portion and a data tag portion, the processed video data portion being a result of a modulo operation performed on a word of video data, the data tag portion being associated with, but not directly representing, a data page number on which a word of video data associated with the processed video data portion, or a processed video data portion of a next input packet, is to be placed, wherein each data tag portion contains fewer bits than each corresponding page count portion; and
a data unpacker configured to read each input packet from the receiver chain, and to generate from each input packet an unpacked packet comprising the processed video data portion and a page count portion, wherein the page count portion directly represents the data page number.

20. The electronic device of claim 19, wherein the data tag portion of a given input packet contains control bits instructing that the word of video data associated with the processed video data portion of the given input packet or a word of video data associated with a processed video data portion of a next input packet is to be placed on a data page immediately subsequent to a current data page.

21. The electronic device of claim 19, wherein the data tag portion of a given input packet contains control bits instructing that the word of video data associated with the processed video data portion of the given input packet or a word of video data associated with a processed video data portion of a next input packet is to be placed on a data page immediately precedent to a current data page.

22. The electronic device of claim 19, wherein the data tag portion of a given input packet contains control bits that, in conjunction with control bits of a data portion of a next input packet, instruct that the word of video data associated with the processed video data portion of the given input packet or a word of video data associated with a processed video data portion of an input packet after the next input packet is to be placed on a data page between 2 and N data pages subsequent to a current data page.

23. The electronic device of claim 22, wherein the control bits of the next input packet instruct that the word of video data associated with the processed video data portion of the given input packet or the word of video data associated with the processed video data portion of the input packet after the next input packet is to be placed on a data page subsequent to the current data page by a number directly represented in the processed video data portion of the next input packet.

24. The electronic device of claim 22, wherein N is less than 16.

25. The electronic device of claim 19, wherein the data tag portion of a given input packet contains control bits that, in conjunction with control bits of a data portion of a next input packet, instruct that the word of video data associated with the processed video data portion of the given input packet or a word of video data associated with a processed video data portion of an input packet after the next input packet is to be placed on a data page between 2 and N data pages preceding to a current data page.

26. The electronic device of claim 25, wherein the control bits of the next input packet instruct that the word of video data associated with the processed video data portion of the given input packet or the word of video data associated with the processed video data portion of the input packet after the next input packet is to be placed on a data page precedent to the current data page by a number directly represented in the processed video data portion of the next input packet.

27. The electronic device of claim 26, wherein N is less than 16.

28. The electronic device of claim 19, wherein the data tag portion of a given input packet contains control bits that, in conjunction with control bits of a data portion of a next input packet and of a data portion of an input packet subsequent to the next input packet, instruct that the word of video data associated with the processed video data portion of the given input packet or a word of video data associated with a processed video data portion of an input packet after the input packet subsequent to the next input packet is to be placed on a data page directly represented in the processed video data portion of the next input packet and the input packet subsequent to the next input packet.

29. The electronic device of claim 19, wherein the data tag portion of a given input packet contains control bits that, in conjunction with control bits of a data portion of a next input packet and of a data portion of an input packet subsequent to the next input packet, instruct that the processed video data portion of the next input packet and the input packet subsequent to the next input packet contain a control command for the receiver chain.

30. A method, comprising:
receiving a stream of packets into a buffer, each packet having a processed video data portion and a page count portion, wherein the processed video data portion is a result of a modulo operation performed on a word of video data, wherein the page count portion is a data page number on which the word of video data is to be placed;
read each packet from the buffer, and generate from each an output packet comprising the processed video data portion and a data tag portion;
wherein the data tag portion is associated with, but does not directly represent, the data page number on which the word of video data associated with the processed video data portion, or the word of video data associated with a processed video data portion of a next packet, is to be placed;
wherein each data tag portion contains fewer bits than each corresponding page count portion; and
transmit each output packet.

31. The method of claim 30, wherein each output packet contains half a number of bits as each corresponding packet.

32. The method of claim 30, wherein the page count portion comprises first and second byte portions; wherein the modulo operation comprises a modulo 16 operation; and wherein the first and second byte portions represent first and second page counter bit portions.

33. The method of claim 30, wherein the page count portion comprises six bits; and wherein the modulo operation comprises a modulo 64 operation.

34. The method of claim 30, wherein the data tag portion of a given output packet contains control bits instructing that the word of video data associated with the processed video data portion of the given output packet or a word of video data associated with a processed video data portion of a next output packet is to be placed on a data page immediately subsequent to a current data page.

35. The method of claim 30, wherein the data tag portion of a given output packet contains control bits instructing that the word of video data associated with the processed video data portion of the given output packet or a word of video data associated with a processed video data portion of a next output packet is to be placed on a data page immediately precedent to a current data page.

* * * * *